US00H002092H

(19) United States

(12) Statutory Invention Registration

Bauman et al.

(10) Reg. No.: US H2092 H

(43) Published: Dec. 2, 2003

(54) PROCESS FOR PRODUCTION OF POLYCHLOROPRENE HAVING LOW ODOR

(75) Inventors: Stevan Charles Bauman, Simpsonville, KY (US); Lance Alan Christell, Baton Rouge, LA (US)

(73) Assignee: DuPont Dow Elastomers L.L.C., Wilmington, DE (US)

(21) Appl. No.: 09/602,715

(22) Filed: Jun. 26, 2000

Related U.S. Application Data

(60) Provisional application No. 60/141,590, filed on Jun. 30, 1999.

(51) Int. Cl.[7] ..... C08F 36/00

(52) U.S. Cl. ..... 523/102; 525/330.8

(58) Field of Search ..... 525/331.2, 330.8, 525/330.9, 388, 387; 523/102

(56) References Cited

U.S. PATENT DOCUMENTS

| | | | | |
|---|---|---|---|---|
| 2,187,146 A | | 1/1940 | Calcott et al. | 18/57 |
| 2,384,277 A | | 9/1945 | Calcott et al. | 18/47.5 |
| 2,467,769 A | | 4/1949 | Morrow et al. | |
| 2,471,456 A | * | 5/1949 | Rust | 260/29.7 |
| 3,147,318 A | * | 11/1964 | Jungk | 260/890 |
| 3,755,232 A | * | 8/1973 | Rodaway et al. | 260/29.7 AT |
| 3,775,388 A | | 11/1973 | Khan | 260/86.3 R |

FOREIGN PATENT DOCUMENTS

| | | | | |
|---|---|---|---|---|
| DE | 195 05 354 A1 | | 8/1996 | C08C/19/04 |
| DE | 19505354 | * | 8/1996 | C08K/19/04 |

OTHER PUBLICATIONS

John C. Carl, Neoprene Latex, Principles Of Compounding And Processing, E. I. duPont de Nemous & Co. (Inc.), 1962, p. 67.

* cited by examiner

*Primary Examiner*—Charles T. Jordan
*Assistant Examiner*—Aileen B. Felton

(57) ABSTRACT

A process for reducing odor in polychloroprene is provided that comprises treatment of a stabilized polychloroprene latex with a compound selected from the group consisting of ozone, hydrogen peroxide, alkali metal salts of halogen oxo acids, alkali metal salts of peroxy acids and mixtures thereof. Polychloroprene latex and solid compositions of low odor prepared by the process are also disclosed.

21 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PRODUCTION OF POLYCHLOROPRENE HAVING LOW ODOR

CROSS-REFERENCE TO RELATED APPLICATIONS

This application claims the benefit of U.S. Provisional Patent Application 60/141,590 filed Jun. 30, 1999.

FIELD OF THE INVENTION

This invention relates to a process for preparation of polychloroprene having reduced odor and to polychloroprene compositions prepared by that process.

BACKGROUND OF THE INVENTION

Polychloroprene is prepared on a commercial scale by free radical initiated emulsion polymerization of 2-chloro-1,3-butadiene (i.e. chloroprene), optionally in the presence of comonomers. Generally, the polymerization is conducted in an aqueous medium in the presence of an anionic soap system, although for certain specialty types of polychloroprene either a nonionic or cationic surfactant is used. A water soluble redox catalyst is normally employed and provides rapid reaction rates at relatively low polymerization temperatures.

In practice, chloroprene monomer and any optional comonomers are added to an aqueous phase containing a surfactant. The mixture is then subjected to high shear, which causes the monomer droplets to be reduced to a few microns in size. Surfactant and monomer distribute between the monomer droplets and surfactant particles (micelles) that are suspended in the aqueous medium. Initiator and optional additives, for example sulfur or chain transfer agents such as mercaptans or dialkyl xanthogen disulfides, are also present in the aqueous or organic phase. Free radicals formed in the aqueous phase migrate to the micelles, where polymerization takes place. When monomer conversion has reached the desired level, a shortstop agent is added which terminates the polymerization reaction. The resultant polymer composition is a polychioroprene latex comprising polymer dispersed in water.

By-products, residual additives and monomers may be removed from the latex by steam stripping. During productionlof dry polychloroprene, additional quantities of these residual additives are removed or reduced during isolation of the dry polymer, for example by water washing polymer film isolated using the freeze roll process and then drying. Such processes are disclosed in U.S. Pat. Nos. 2,467,769 (Morrow et al.); 2,187,146 (Calcott et al.); and 2,384,277 (Calcott et The presence of by-products in polychloroprene latex, for example chloroprene dimers and other unidentified low molecular weight materials, can have an undesirable effect on the odor and physical properties of elastomeric materials prepared from the latex. Even rigorously stripped latexes can retain an undesirable odor. In the past, various methods have been utilized to reduce the odor of polychloroprene latex or solid polychloroprene, for example by addition of reodorants such as vanillan, o wintergreen, terpineol, anisic aldehyde, oil of cloves, camphor, and coumarin, as disclosed in J. C. Carl, Neoprene Latex, 67, E. I. du Pont de Nemours & Co. (1962). Addition of reodorants does not eliminate undesirable odor in the finished product, but rather masks it.

The presence of minor odors associated with polychloroprene latexes has caused these products to be excluded from use in a number of product formulations, even though performance properties are excellent. For example, polychloroprenes are not utilized in manufacture of adhesives for certain food packaging applications due to odor and taste problems caused by the presence of residual reodorants. An effective process for eliminating taste and odor-producing components of polychloroprene without addition of reodorants would permit use of high performance polychloroprene adhesives in food packaging applications.

SUMMARY OF THE INVENTION

The present invention is directed to a process for producing a polychloroprene composition of low odor which comprises mixing a stabilized polychloroprene latex having a chloroprene monomer content of 0.8 weight percent or less with a compound selected fro m the group consisting of ozone, hydrogen peroxide, alkali metal salts of halogen oxo acids, alkali metal salts of peroxy acids and mixtures thereof The present invention is further directed to a polychloroprene latex of low odor prepared by a process which comprises mixing a stabilized polychloroprene latex having a chloroprene monomer content of 0.8 weight percent or less with a compound selected from the group consisting of ozone, hydrogen peroxide, alkali metal salts of halogen oxo acids, alkali metal salts of peroxy acids and mixtures thereof.

In addition, the present invention is directed to a solid chloroprene polymer of low odor prepared by a process comprising isolating a solid chloroprene polymer from a stabilized polychloroprene latex, wherein said stabilized polychloroprene latex is prepared by a process comprising mixing a polychloroprene latex having a chloroprene monomer content of 0.8 weight percent or less with a compound selected from the group consisting of ozone, hydrogen peroxide, alkali metal salts of halogen oxo acids, alkali metal salts of peroxy acids and mixtures thereof.

DETAILED DESCRIPTION OF THE INVENTION

The compositions of the present invention are polychloroprenes (i.e. polymers having polymerized units of chloroprenee) characterized by low odor, low residual monomer content and excellent curing profile. The polychloroprenes can be in the form of latexes (i.e. polymer dispersed in aqueous media) or solids. The polychloroprene latexes can be used to manufacture dipped goods that exhibit many of the elastomeric properties of natural rubber, but which have lower odor and are less allergenic. The latexes may also be used to form adhesives that have low odor and provide excellent adhesion and tack. The isolated, solid form of the polymer can be used in manufacture of a variety of elastomeric articles, such as hoses, belts, gaskets, elastomeric thread, closed cell foam, and other general purpose rubber goods. The isolated polymer may also be dissolved in solvents to form adhesive compositions.

The compositions of the invention are prepared by a process that comprises treating a stabilized polychloroprene latex with an oxygenating substance that reduces its odor without compromising important physical properties, such as elongation at break. By "stabilized" is meant that free radical polymerization reactions in the polychloroprene latex have been terminated, for example by treatment with a short-stopping agent. Stabilized latexes that have been treated with oxygenating agents according to the present invention are characterized by marked reduction in odor compared to freshly prepared, untreated latexes. In addition, films prepared from samples of treated latex have a reduced odor when compared to films prepared from untreated latex.

Such solid polychloroprene compositions of the invention are prepared from the treated latex using techniques such as coagulation, extrusion, or freeze roll isolation.

Polychloroprene latex is produced in a free radical emulsion polymerization reaction. The polymerization reaction is most commonly carried out in aqueous emulsion at temperatures of between 0C. to 80° C., in the presence of initiators such as potassium persulfate or cumene hydroperoxide. In a first step, chloroprene monomer or a mixture of chloroprene monomer and any optional copolymerizable monomers is added to a stirred reaction vessel. Such copolymerizable comonomers include, but are not limited to styrene; the vinyltoluenes and vinylnaphthalenes; 1,3-butadiene; isoprene; 2,3-dimethyl-1,3-butadiene; 2,3-dichloro-1,3-butadiene; methyl vinyl ether; vinyl acetate; methyl vinyl ketone; acrylic and methacrylic acids; ethyl acrylate; methyl methacrylate; methacrylamide; and acrylonitrile. Any such comonomer present will be added in an amount that will result in incorporation of up to 65 weight percent of one or more of the comonomers in the polymer produced during the polymerization reaction. That is, the polychloroprene component of the latex produced will comprise at least 35 weight percent copolymerized units of chloroprene. Generally, the amount of comonomer or comonomers used will be an amount that results in incorporation of up to 20 weight percent copolymerized units in the isolated, solid polymer. However, useful polychloroprene latexes can comprise chloroprene copolymers that contain up to 65 weight percent comonomer or comonomers, for example a copolymer latex wherein the copolymer is a dipolymer of chloroprene and 2,3-dichloro-1,3-butadiene. The amount of comonomer or comonomers added will vary depending on the comonomer reactivity and the amount of incorporation desired. The polymerization may take place in the presence of element sulfur, in which case the polymer produced will contain polysulfide linkages. Alternatively, the polymerization may take place in the presence of chain transfer , such as dialkyl xanthogen disulfides, dialkoxyxanthogen disulfides, iodoforr alkyl mercaptans. As is well known in the art, polymerization can be carried to a predetermined desired degree and stopped by use of conventional "short-stopping" agents. Such agents include phenothiazine, hindered phenols, or other radical trapping agents. Generally, monomer conversion is from about 50%–100%. Preferably, monomer conversion will be from 60%–98%. Emulsifying agents will also be present in the polymerization mixture.

Unreacted monomer can be rem oved by conventional procedures such as, for example, steam stripping. The level of chloroprene monomer in stabilized polychloroprene latex can usually be reduced to below 0.8 weight percent, preferably below 0.5 weight percent, most preferably below 0.1 weight percent by this procedure. In some instances, polymerization conditions and high conversion will result in production of latexes having residual chloroprene monomer levels below 0.8 weight percent. In such cases, a stripping step is not required.

Following termination of the polymerization reaction and optional stripping of the polymer latex, an oxygenating compound is added to the latex. The latex will have a chloroprene monomer level of 0.8 wt. percent or less at this point. The oxygenating compound is selected from the group consisting of ozone, hydrogen peroxide, alkali metal salts of halogen oxo acids, alkali metal salts of peroxy acids and mixtures thereof. Examples of halogen oxo acids are FOH, ClOH, $HClO_2$, $HClO_3$, $HClO_4$, BrOH, $HBrO_2$, $HBrO_3$, $HBrO_4$, IOH, and $HIO_4$. Examples of peroxy acids include percarbonic acid, perboric acid and persulfuric acid. Preferably, the alkali metal will be sodium or potassium. Preferred oxygenating compounds include sodium bromate, sodium percarbonate, and sodium perborate. Especially preferred oxygenating compounds are ozone, sodium hypochlorite and hydrogen peroxide because they are readily available and cost effective compared to other agents. The oxygenating compounds may be added to polychloroprene latex in the form of solids, gases, liquids or solutions, depending on the agent selected. Generally 0.01 to 5.0 parts by weight per 100 parts by weight polychloroprene latex of oxygenating compound is used and the 0.01 to 0.5 parts by weight refers to the amount of active ingredient of a liquid or solid oxygenating compound, rather than/the amount of an aqueous solution of the oxygenating agent. Ozone may be bubbled into the latex as a gas. Preferably, such addition of ozone will take place over a cumulative period of 20 minutes to 24 hours, depending on the quantity of latex to be treated and ozone-generating apparatus used, in approximately 5 minute intervals, to permit any foam produced to settle. Hydrogen peroxide is preferably added as an aqueous solution.

Preferably between about 0.025–1.0 parts by weight of the liquid or solid oxygenating compounds per 100 parts by weight polychloroprene latex will be added. Generally, the higher the level of oxygenating compound, the greater the degree of odor reduction. At levels above about 5.0 parts by weight of oxygenating compound per 100 parts by weight of polychloroprene latex the deodorizing effect does not increase appreciably and therefore the use of higher levels is not economically efficient.

The concentration of ozone generated by some ozone-generating apparatuses is difficult to control. It has been found that, in general, if kilogram quantities of polychloroprene latexes are treated for a period of from 20–60 minutes with ozone from an ozone bubbler, such as a commercial pool or spa ozonater, then a marked reduction in odor of the latex, and polymers isolated therefrom, results. Larger volumes of latex may require longer treatment periods to reach the same level of odor reduction. For example, treatment of a 10,000–20,000 liter quantity of latex with a single ozone source at low bubble rates with good agitation may require approximately 8–10 hours to achieve a significant degree of odor reduction. Alternatively, treatment for 1 hour with multiple small ozone sources and excellent agitation would be an effective method of treatment. In either case, it is preferable to introduce the ozone in short time segments, interspersed with time for any foam to settle.

The oxygenating agents useful in the practice of the invention are effective in reducing odor associated with polychloroprene latex when 0.8 weight percent or less of residual chloroprene monomer is present in the latex to be treated. When levels of chloroprene monomer above 0.8 weight percent are present, some agents initiate polymerization. For example, potassium persulfate is commonly used as a chloroprene polymerization initiator. It also is effective at reducing odor in isolated, stripped polychloroprene latex. Consequently, addition of oxygenating compounds for purposes of odor reduction should be made at a point where the level of chloroprene monomer has been reduced to 0.8 weight percent or less, preferably 0.5 weight percent or less, most preferably 0.1 weight percent or less.

Odor reduction is difficult to quantify, but a measure of odor reduction can generally be obtained by allowing polychloroprene films isolated from both untreated latexes and the treated latexes of the invention to equilibrate in separate sealed containers for a 12 hour period and then comparing the odor of the various samples. It is usually possible for individuals to distinguish between films that have a strong odor and those having a reduced odor to the extent that odor can be distinguished and rated on a scale of 1–4 or 1–5 for strongest to least odor. Semi- quantitative results can be obtained using gas chromatographic methods. For example, the Aromatrax™ system developed by Microanalytics, Inc. is a gas chromatographic method that can be used to detect odorous components of organic mixtures.

Polychloroprene latex is an article of commerce and is useful in preparation of manufactured articles such as gloves or adhesives. However, most polychloroprene is sold in the solid form (generally in the form of chips), after isolation from the latex. Isolation of the solid polymer is generally performed using a freeze roll process wherein a film of the polymer is isolated, washed, dried, and then cut into chips.

It has been found that, in comparison to polychloroprenes that have not been treated with an oxygenating compound of the above-described types, the treated polychloroprenes of the invention are markedly lower in odor. Odor in polychloroprene has been attributed to the presence of chloroprene dimers and other by-products of the polymerization process. Whatever its source, treatment of the latex with oxygenating compounds has been found to decrease the odor of polymer film prepared from polychloroprene latex. Although the precise mechanism of odor reduction accomplished by the process of the invention is not established, the presence of reactive oxygen atoms in the group of compounds suitable for use in the invention suggests that the compounds react with impurities or by-products present in the latex to form materials of low odor and taste.

A further benefit of the process of the invention is that treatment with oxygenating compounds improves certain physical properties of polychloroprene isolated from the treated latexes. In particular, the curing characteristics of the polychloroprenes may be customized by selecting an appropriate oxygenating compound according to the process of the invention. For example, polychloroprene latex suitable for use in preparation of solvent-borne adhesives may be treated with sodium hypochlorite to improve cure rate of isocyanate- based cures. If a more stable adhesive is desired, it may be treated with ozone to retard isocyanate cure rate. In other applications, improved tensile strength at higher elongation is obtained using latexes prepared by the process of the present invention.

Advantages of the process of the invention include the ready availability of the oxygenating compounds and their effectiveness at low levels. Because the perception of odor and taste is highly subjective, the level of oxygenating compound added can be easily modified to fit the level of odor reduction necessary.

The treated latexes of the present invention are particularly useful for preparation of adhesive compositions for use in food packaging. They are also useful in manufacture of gloves and other dipped goods, balloons, and blood pressure cuffs. Gloves and balloons are of particular interest as replacements for natural rubber. Gloves made from natural rubber latex are known to cause allergic reactions in up to 25% of medical professionals. Also, hospitals are creating natural rubber free zones for sensitized workers and patients. The treated polychloroprene latexes and solid polymers derived therefrom are also suitable for use in applications such as binders, coatings, foams and general rubber articles, such as hoses, belts, foam mattresses, elastomeric thread, tubing, and wet suits.

The invention is illustrated by the following embodiments wherein all parts are by weight unless otherwise indicated.

EXAMPLES

Example 1

A treated polychloroprene latex of the invention, Sample 1A, was prepared by adding 100 ml of a 15% aqueous hydrogen peroxide solution to 2 liters of Neoprene L-750 latex polychloroprene latex (an aqueous emulsion of a copolymer of chloroprene and 2,3-dichloro-1,3-butadiene, available from DuPont Dow Elastomers L.L.C). The concentration of active ingredient was 0.75 parts hydrogen peroxide per 100 parts Neoprene L-750. The latex was stirred under vacuum (water aspirator) for 2 hours. Films were cast from the Sample 1A latex in 22×22 cm forms and dried overnight. The resultant films were elastomeric and had low odor. Two additional polychloroprene latexes of the invention, Samples 1B and 1C, were prepared in a substantially similar manner using the components shown in Table I. The concentrations of active ingredient were 0.26 parts sodium hypochlorite per 100 parts Neoprene L-750 latex and Neoprene L-671A latex, respectively. These films were also elastomeric and had low odor. Samples of films prepared from the Sample 1A, 1B and 1C latexes, untreated Neoprene L-750 latex (Control I) and untreated Neoprene L-671 A latex (Control II) were each placed in sealed jars. After equilibration of the films in the jars overnight, the odor of each film was assessed by a panel of five individuals. The odor was rated on a scale of from 1–5, with 1 being strongest and 5 being least. The results are shown in Table I.

TABLE I

| | Sample 1A | Sample 1B | Sample 1C | Control I | Control II |
|---|---|---|---|---|---|
| Latex | Neoprene L-750 Latex | Neoprene L-750 Latex | Neoprene L-671A Latex | Neoprene L-750 Latex | Neoprene L-671A Latex |
| Oxygenating Compound | Hydrogen Peroxide | Sodium Hypo-chlorite | Sodium Hypo-chlorite | None | None |
| Odor Rating | | | | | |
| Tester 1 | 3 | 4 | 5 | 2 | 1 |
| Tester 2 | 3 | 5 | 4 | 2 | 1 |
| Tester 3 | 2 | 3 | 5 | 1 | 4 |
| Tester 4 | 4 | 5 | 3 | 2 | 1 |
| Tester 5 | 3 | 5 | 4 | 2 | 1 |

The Sample 1A and 1B latexes, as well as the Control I latex were compounded as shown in Table II, where all parts are by weight. Polymer samples were isolated from the latexes and used to form test specimens that were cured and tested using the methods of ASTM D 412. The results are shown in Table II.

TABLE II

| Component[1] | 1A | 1B | Control I |
|---|---|---|---|
| Sample 1A Latex | 500 | 0 | 0 |
| Sample 1B Latex | 0 | 500 | 0 |
| Neoprene L-750 Latex | 0 | 0 | 500 |
| Additive Masterbatch[3] | 87.5 | 87.5 | 87.5 |
| Aquarex SMO[3] | 22.5 | 22.5 | 22.5 |
| Sulfur | 5 | 5 | 5 |
| Thiuram E[4] | 7.5 | 7.5 | 7.5 |
| Tepidone[5] | 5 | 5 | 5 |
| Physical Properties | | | |
| Properties of Samples | | | |

TABLE II-continued

| Component[1] | 1A | 1B | Control I |
|---|---|---|---|
| Cured @ 120° C. | | | |
| $M_{100}$, (MPa) | 12.8 | 12.5 | 11.9 |
| $T_B$, (MPa) | 19.9 | 18.4 | 17.3 |
| $E_B$, (%) | 721 | 740 | 731 |
| Properties of Samples Cured @ 140° C. | | | |
| $M_{100}$, (MPa) | 11.4 | 12.1 | 11.7 |
| $T_B$, (MPa) | 24.3 | 21.2 | 23.3 |
| $E_B$, (%) | 903 | 834 | 865 |
| Properties of Samples Cured @ 160° C. | | | |
| $M_{100}$, (MPa) | 8.7 | 8.4 | 8.5 |
| $T_B$, (MPa) | 8.7 | 10.2 | 8.4 |
| $E_B$, (%) | 1000 | 1024 | 980 |

[1]In parts by weight
[2]The additive masterbatch contained (parts by weight) 28.6 parts clay, 14.3 parts ZnO, 5.7 parts of Wingstay L(a reaction product of para-cresol and dicyclopentadiene), 1.45 parts ammonium caseinate, 0.49 parts Aquarex SMO, 0.15 parts NaOH, and 49.3 parts $H_2O$.
[3]Sodium salt of sulfated methyl oleate
[4]Tetraethyl thiuram disulfide
[5]Sodium dibutyldithiocarbamate The results indicate that samples produced using the process of the invention that are cured at low temperatures (e.g. 120° C.) exhibit improved tensile strength ($T_B$). In addition, elongation at break ($E_B$) is not compromised in samples prepared from latexes produced by the process of the invention.

Example 2

A treated polychloroprene latex of the invention, Sample 2A, was prepared as follows. A sample of 11.2 liters of a polychloroprene homopolymer latex, Neoprene L-735A polychloroprene latex (available from DuPont Dow Elastomers L.L.C.), was circulated through a venturi. Ozone was simultaneously introduced through the vacuum port of the venturi from a commercial spa ozonator (Lightning Series Ozone Converter, available from Hercules Products, Inc.). The ozone was drawn in during five separate, 5-minute intervals over a period of 2.5 hours. This permitted the foam produced to settle. Cast films were produced from the resultant latex in 22×22 cm forms. In addition, thinner films were isolated by freezing a thin layer of latex on a freeze roll, washing the resultant coagulated film, and drying it in a serpentine dryer unit. The films were elastomeric and had low odor. An additional polychloroprene latex of the invention, Sample 2B, was prepared by treating 2 liters of Neoprene L-735A polychloroprene latex with 100 ml of commercial bleach (5.25% aqueous sodium hypochlorite solution). The concentration of active ingredient was 0.26 parts of sodium hypochlorite per 100 parts Neoprene L-735A latex The latex was stirred under vacuum (water aspirator) for 2 hours. Films were isolated by the method of Example 1. The resultant films were elastomeric and had low odor. Samples of films prepared from the Sample 2A and 2B latexes and from untreated Neoprene L-735A latex (Control III) were each placed in sealed jars. After equilibration in the jars overnight, the odor of each film was assessed by a panel of four individuals. Odor was on a scale of 1–4, with 1 being strongest and 4 being least. The results are shown in Table III.

TABLE III

| | Sample 2A[1] | Sample 2A[2] | Sample 2B[2] | Control III |
|---|---|---|---|---|
| Latex | Neoprene L-735A Latex | Neoprene L-735A Latex | Neoprene L-735A Latex | Neoprene L-735A Latex |
| Oxygenating Compound | Ozone | Ozone | Sodium Hypochlorite | None |
| Odor Rating | | | | |
| Tester 1 | 2 | 3 | 4 | 1 |
| Tester 2 | 2 | 4 | 3 | 1 |
| Tester 3 | 3 | 2 | 4 | 1 |
| Tester 4 | 2 | 3 | 4 | 1 |

[1]Cast film
[2]Freeze coagulated film

A 10% toluene solution of the isolated Example 2B polymer was prepared. To 150 ml of this solution was added 8 ml Desmodur® RF-EE isocyanate curing agent (available from Bayer AG). Toluene solutions of Sample 2B and a control polymer, Control IV, isolated from Neoprene L-735A polychloroprene latex were prepared in substantially the same manner. The change in Brookfield viscosity was monitored with time for each of the three solutions. Results are shown in Table IV. The data indicate that ozone treatment of the Sample 2A latex retards the rate of cure of the Sample 2A polychloroprene/isocyanate mixture compared to the polychloroprene/isocyanate mixture prepared from polychloroprene of the control. This is illustrated by the slower rise in viscosity of the Sample 2A polychloroprene/isocyanate mixture compared to the control. The data also indicate that treatment of the Sample 2B latex with sodium hypochlorite accelerates the rate of cure in the Sample A/isocyanate mixture, compared to the control latex/isocyanate mixture, as illustrated by more rapid rise of viscosity of the Sample 2B polychloroprene/isocyanate mixture compared to that of the control.

TABLE IV

| Brookfield Viscosity (centipoise) | Sample 2A | Sample 2B | Control IV |
|---|---|---|---|
| Initial viscosity | 155 | 165 | 135 |
| After 1.5 hours | 150 | 153 | 140 |
| After 2.25 hours | | 235 | |
| After 3 hours | | 935 | |
| After 3.5 hours | 280 | 4600 | 230 |
| After 4.5 hours | 380 | | 580 |
| After 5 hours | 430 | | 1710 |

Example 3

Two liters of Neoprene Latex L-735A polychloroprene latex was treated with 100 ml of a 15% aqueous hydrogen peroxide solution. The concentration of Neoprene L-735A latex. The latex active ingredient was 0.75 parts hydrogen peroxide per 100 parts was stirred under vacuum (water aspirator) for 2 hours. Films of the latex were isolated by freezing a thin film of latex on a freeze roll, washing the resultant coagulated film, and drying it in a serpentine dryer unit. The films were elastomeric and had low odor.

Example 4

A polychloroprene latex of the invention was prepared by stirring 1 liter of Neoprene L-735A polychloroprene latex and 50 ml of a 2.5% aqueous solution of sodium perborate for two hours. The concentration of active ingredient was 0.125 parts sodium perborate per 100 parts Neoprene L-735A latex. The latex was then aged at room temperature overnight. Films were cast from the resultant latex in 22×22 cm forms. The films were elastomeric and had low odor.

Example 5

A polychloroprene latex of the invention was prepared by stirring 1 liter of Neoprene L-735A polychloroprene latex and 50 ml of a 7.8% aqueous solution of sodium percarbonate for two hours. The concentration of active ingredient was 0.39 parts sodium percarbonate per 100 parts Neoprene L-735A latex. The latex was aged at room temperature overnight. Films were cast from the resultant latex in 22×22 cm forms. The films were elastomeric and had low odor.

Example 6

A polychloroprene latex of the invention, Sample 6A, was prepared by stirring a mixture of 1 liter of Neoprene L-735A polychloroprene latex and 5 ml of a 15% aqueous hydrogen peroxide solution for two hours. The concentration of active ingredient was 0.075 parts hydrogen peroxide per 100 parts Neoprene L-735A latex. The latex was then aged at room temperature overnight. Films were cast from the resultant latex in 22×22 cm forms. The films were elastomeric and had low odor. Two additional latexes of the invention, Samples 6B and 6C, were prepared in substantially the same manner, except that Sample 6B was prepared using 10 ml 15% aqueous hydrogen peroxide solution and Sample 6C was prepared using 20 ml 15% aqueous hydrogen peroxide solution. The concentrations of active ingredients were 0.15 parts hydrogen peroxide per 100 parts Neoprene L-735A latex, and 0.3 parts of hydrogen peroxide per 100 parts Neoprene L-735A latex, respectively. Odor of the films was assessed in comparison with that of a film of untreated Neoprene Latex L-735A (Control V). Results are shown in Table V.

TABLE V

| | Control V | Sample 6A | Sample 6B | Sample 6C |
|---|---|---|---|---|
| Neoprene L-735A Latex (ml) | 1000 | 1000 | 1000 | 1000 |
| 15% Aqueous $H_2O_2$ (ml) | 0 | 5 | 10 | 20 |
| Odor Rating | Strong | <Control V | <Sample 6A | <Sample 6B |

Example 7

Films were cast from a polychloroprene latex of the invention, Sample 7A, prepared by treatment of 1 liter Neoprene L-750 polychloroprene latex and 5 ml of a 15% aqueous hydrogen peroxide solution as described in Example 6. The concentration of active ingredient was 0.075 parts hydrogen peroxide per 100 parts Neoprene L-750 latex. The films were elastomeric and had low odor. Two additional latexes of the invention, Samples 7B and 7C, were prepared in substantially the same manner, except that Sample 7B was prepared using 10 ml of a 15% aqueous hydrogen peroxide solution and Sample 7C was prepared using 20 ml of a 15% aqueous hydrogen peroxide solution. The active ingredient concentrations were 0.15 parts hydrogen peroxide per 100 parts Neoprene L-750 latex and 0.3 parts hydrogen peroxide per 100 parts Neoprene L-750 latex, respectively. Odor of the films was assessed in comparison with that of a film of untreated Neoprene Latex L-750A (Control VI). Results are shown in Table VI.

TABLE VI

| | Control VI | Sample 7A | Sample 7B | Sample 7C |
|---|---|---|---|---|
| Neoprene L-750 Latex (ml) | 1000 | 1000 | 1000 | 1000 |
| 15% Aqueous $H_2O_2$ (ml) | 0 | 5 | 10 | 20 |
| Odor Rating | Strong | <Control VI | <Sample 7A | <Sample 7B |

Example 8

Films were cast from a polychloroprene latex of the invention, Sample 8A, prepared by treatment of Neoprene L-735A polychloroprene latex and 5 ml of bleach (a 5.25% aqueous solution of sodium hypochlorite) as described in Example 6. The concentration of active ingredient concentration was 0.26 parts sodium hypochlorite per 100-parts Neoprene L-735A latex. The films were elastomeric and had low odor. Two additional latexes of the invention, Samples 8B and 8C, were prepared in substantially the same manner using 10 ml sodium hypochlorite solution and 20 ml sodium hypochlorite solution, respectively. The active ingredient concentrations were 0.053 parts sodium hypochlorite per 100 parts Neoprene L-735A latex and 0.105 parts sodium hypochlorite per 100 parts Neoprene L-735A latex, respectively. Odor of the films was assessed in comparison with that of a film of untreated Neoprene Latex L-735A (Control VII). Results are shown in Table VII.

TABLE VII

| | Control VII | Sample 8A | Sample 8B | Sample 8C |
|---|---|---|---|---|
| Neoprene L-735A Latex (ml) | 1000 | 1000 | 1000 | 1000 |
| Bleach (ml) | 0 | 5 | 10 | 20 |
| Odor Rating | Strong | <Control VII | <Control VII | <Control VII |

Example 9

Films were cast from a polychloroprene latex of the invention, Sample 9A, prepared by treatment of Neoprene L-750 polychloroprene latex and 5 ml of bleach (a 5.25% aqueous solution of sodium hypochlorite) as described in Example 6. The concentration of active ingredient was 0.026 parts sodium hypochlorite per 100 parts Neoprene L-750 latex. The films were elastomeric and had low odor. Two additional latexes of the invention, Samples 9B and 9C, were prepared in substantially the same manner using 10 ml of sodium hypochlorite solution and 20 ml of sodium hypochlorite solution, respectively. The active ingredient concentrations were 0.053 parts sodium hypochlorite per 100 parts Neoprene L-750 latex and 0.105 parts sodium hypochlorite per 100 parts Neoprene L-750 latex, respectively. Odor of the films was assessed in comparison with that of a film of untreated Neoprene Latex L-750 (Control VIII). Results are shown in Table VIII.

TABLE VIII

| | Control VIII | Sample 9A | Sample 9B | Sample 9C |
|---|---|---|---|---|
| Neoprene L-750 Latex | 1000 | 1000 | 1000 | 1000 |

TABLE VIII-continued

| | Control VIII | Sample 9A | Sample 9B | Sample 9C |
|---|---|---|---|---|
| (ml) | | | | |
| Bleach (ml) | 0 | 5 | 10 | 20 |
| Odor Rating | String | <Control VIII | <Sample 9A | <Sample 9B |

Example 10

Sample 10A, a polychloroprene latex of the invention, was prepared as described in Example 6 using 1 liter of Neoprene L-735A polychloroprene latex and a mixture of 10 ml bleach (5.25% aqueous sodium hypochlorite; 0.053 parts sodium hypochlorite per 100 parts Neoprene L-750 latex) and 30 ml of a 15% aqueous hydrogen peroxide solution (0.45 parts peroxide per 100 parts Neoprene L-735A latex). A second polychloroprene latex of the invention, Sample 10B, was prepared in the same manner, except that a mixture of 30 ml bleach (0.16 parts sodium hypochlorite per 100 parts Neoprene L-735A latex) and 10 ml 15% aqueous hydrogen peroxide solution (0.15 parts hydrogen peroxide per 100 parts Neoprene L-735A latex) was used. In addition, a third latex of the invention, Sample 10C, was prepared in substantially the same manner as Sample 10A, except that a mixture of 20 ml of 15% aqueous hydrogen peroxide solution (0.105 parts hydrogen peroxide per 100 parts Neoprene L-735A latex) and 20 ml of 7.8% aqueous sodium percarbonate solution (0.16 parts hydrogen peroxide per 100 parts Neoprene L-735A latex) were used. Films were cast from the Sample 10A, 10B, and 10C latexes, as described in Example 6. In addition, films were isolated from each of the latexes by freezing a thin film on a freeze roll, washing the resultant coagulated film and drying it in a serpentine dryer unit. The odor of the elastomeric films was assessed and compared to that of films similarly prepared from an untreated sample of Neoprene L-735A latex (Control IX). Results are shown in Table IX.

TABLE IX

| | Control IX | Sample 10A | Sample 10B | Sample 10C |
|---|---|---|---|---|
| Neoprene L-735A Latex (ml) | 1000 | 1000 | 1000 | 1000 |
| Bleach (ml) | 0 | 30 | 10 | 0 |
| 15% Aq. $H_2O_2$ (ml) | 0 | 10 | 30 | 20 |
| 7.8% Sodium Percarbonate | 0 | 0 | 0 | 20 |
| Odor Rating | String | <Contrl IX | <Control IX | <Control IX |

What is claimed is:

1. A process for producing a polychloroprene composition of low odor which comprises mixing a stabilized polychloroprene latex having a chloroprene monomer content of 0.8 weight percent or less with a compound selected from the group consisting of ozone, hydrogen peroxide, alkali metal salts of halogen oxo acids, alkali metal salts of peroxy acids, and mixtures thereof.

2. The process of claim 1 wherein the stabilized polychloroprene latex comprises a homopolymer of chloroprene.

3. The process of claim 1 wherein the stabilized polychloroprene latex comprises a copolymer of chloroprene having up to 65 weight percent of copolymerized comonomer units.

4. The process of claim 1 wherein the chloroprene monomer content of the stabilized polychloroprene latex is less than 0.5 weight percent.

5. The process of claim 1 wherein the chloroprene monomer content of the stabilized polychloroprene latex is less than 0.1 weight percent.

6. The process of claim 1 wherein the stabilized polychloroprene latex is mixed with 0.01 to 5.0 parts by weight per 100 parts by weight of polychloroprene latex of a compound selected from the group consisting of hydrogen peroxide, alkali metal salts of halogen oxo acids, alkali metal salts of peroxy acids, and mixtures thereof.

7. The process of claim 6 wherein the stabilized polychloroprene latex is mixed with 0.02 to 1.0 parts by weight per 100 parts by weight of polychloroprene latex of a compound selected from the group consisting of hydrogen peroxide, alkali metal salts of halogen oxo acids, alkali metal salts of peroxy acids, and mixtures thereof.

8. The process of claim 1 wherein ozone is introduced to the stabilized polychloroprene latex over a period of from 20 minutes to 24 hours.

9. A polychloroprene latex of low odor prepared by a process which comprises mixing a stabilized polychloroprene latex having a chloroprene monomer content of 0.8 weight percent or less with a compound selected from the group consisting of ozone, hydrogen peroxide, alkali metal salts of halogen oxo acids, alkali metal salts of peroxy acids, and mixtures thereof.

10. A polychloroprene latex of claim 9 wherein the stabilized polychloroprene latex is prepared in the presence of a sulfur modifier.

11. A polychloroprene latex of claim 9 wherein the stabilized polychloroprene latex is prepared in the presence of a mercaptan modifier.

12. A polychloroprene latex of claim 9 wherein the stabilized polychloroprene latex is prepared in the presence of a modifier selected from the group consisting of dialkylxanthogen disulfides and dialkoxyxanthogen disulfides.

13. A polychloroprene latex of claim 9 wherein the stabilized polychloroprene latex is prepared in the presence of an iodoform modifier.

14. A polychloroprene latex of claim 9 wherein stabilized polychloroprene latex is a polychloroprene homopolymer latex.

15. A polychloroprene latex of claim 9 wherein the stabilized polychloroprene latex is a polychloroprene copolymer latex, the polychloroprene copolymer comprising at least 35 weight percent copolymerized chloroprene units.

16. A solid chloroprene polymer of low odor prepared by a process comprising isolating a solid chloroprene polymer from a polychloroprene latex, wherein said polychloroprene latex is prepared by a process comprising mixing a stabilized polychloroprene latex having a chloroprene monomer content of 0.8 weight percent or less with a compound selected from the group consisting of ozone, hydrogen peroxide, alkali metal salts of halogen oxo acids, alkali metal salts of peroxy acids, and mixtures thereof.

17. A solid polychloroprene polymer of claim 16 wherein the stabilized polychloroprene latex is prepared in the presence of a sulfur modifier.

18. A solid polychloroprene polymer of claim 16 wherein the stabilized polychloroprene latex is prepared in the presence of a mercaptan modifier.

19. A solid polychloroprene polymer of claim 16 wherein the stabilized polychloroprene latex is prepared in the presence of a modifier selected from the group consisting of dialkylxanthogen disulfides and dialkoxyxanthogen disulfides.

20. A solid polychloroprene polymer of claim 16 wherein the stabilized polychloroprene latex is a polychloroprene homopolymer latex.

21. A solid polychloroprene polymer of claim 16 wherein the stabilized polychloroprene latex is a polychloroprene copolymer latex, the polychloroprene copolymer comprising at least 80 weight percent copolymerized chloroprene units.

* * * * *